United States Patent
Coldre et al.

(10) Patent No.: US 8,632,115 B2
(45) Date of Patent: Jan. 21, 2014

(54) HATCH SYSTEM FOR A MOTOR CRAFT, IN PARTICULAR FOR AN AUTOMOBILE VEHICLE

(75) Inventors: Laurent Coldre, La Neuville sur Essonne (FR); Bertrand Florentz, Paucourt (FR)

(73) Assignee: Hutchinson S.A., Paris (FR)

( * ) Notice: Subject to any disclaimer, the term of this patent is extended or adjusted under 35 U.S.C. 154(b) by 0 days.

(21) Appl. No.: 13/397,939

(22) Filed: Feb. 16, 2012

(65) Prior Publication Data
US 2012/0212006 A1    Aug. 23, 2012

(30) Foreign Application Priority Data
Feb. 17, 2011 (FR) ...................... 11 00483

(51) Int. Cl.
*B60J 5/00* (2006.01)
(52) U.S. Cl.
USPC ..................... 296/146.4; 296/146.8
(58) Field of Classification Search
USPC ......... 296/146.12, 202, 146.4, 146.13, 146.8, 296/76, 146.11
See application file for complete search history.

(56) References Cited

U.S. PATENT DOCUMENTS

| | | | |
|---|---|---|---|
| 4,684,167 A | | 8/1987 | Newmayer |
| 6,068,327 A | * | 5/2000 | Junginger ................ 296/146.13 |
| 7,828,366 B2 | * | 11/2010 | Andre et al. ............... 296/146.8 |
| 2007/0283535 A1 | | 12/2007 | Hoffman |

FOREIGN PATENT DOCUMENTS

| | | |
|---|---|---|
| FR | 2 945 241 | 11/2010 |
| JP | 59 202932 | 11/1984 |

* cited by examiner

*Primary Examiner* — Joseph Pape
*Assistant Examiner* — Dana Ivey
(74) *Attorney, Agent, or Firm* — Morgan, Lewis & Bockius LLP (57) ABSTRACT

Hatch system (1) for a motor craft, in particular for an automobile vehicle, for example, the hatch (1) being mounted articulated about a substantially horizontal fixed main rotation axis (A) supported by the chassis of the motor craft, and being movable about the main rotation axis (A) manually or automatically by drive means (5) between a closed position and an open position, characterized in that, during a phase of movement of the hatch (1), the drive means (5) driving rotation of the hatch (1) about the main rotation axis (A) actuate means (7) for maneuvering the hatch (1) in rotation in the opposite direction about a secondary rotation axis (B), the combination of these two movements in rotation causing the hatch (1) to move in a substantially vertical plane without necessarily causing lateral movement of the hatch during this phase of movement of the hatch (1).

17 Claims, 10 Drawing Sheets

HATCH SYSTEM FOR A MOTOR CRAFT, IN PARTICULAR FOR AN AUTOMOBILE VEHICLE

RELATED APPLICATIONS

The present application is a U.S. Utility Application of French Patent No. 11 00483 (filed Feb. 17, 2011) which is hereby incorporated by reference in its entirety.

FIELD OF THE DISCLOSURE

The invention concerns a hatch system for a motor craft, in particular for an automobile vehicle, although this system could equally well be used in the aeronautical, rail or naval field, for example.

BACKGROUND

In the automobile field, the term hatch designates a mobile bodywork panel, glazed or unglazed, enabling access to the interior of the passenger compartment, the engine compartment or the trunk of the vehicle.

Generally speaking, there is a plurality of hatch families, namely:
- "hinged door" type hatches that are the most widely used in the automobile industry, one side of these hatches pivoting about a substantially horizontal or vertical axis between a closed position and an open position;
- "sliding" type hatches that slide in a substantially vertical plane between a closed position and an open position;
- "vertical" type hatches that pivot in a substantially vertical plane about a substantially horizontal axis more or less perpendicular to the plane of the hatches between a closed position and an open position; and
- "gull-wing" type hatches that pivot about a substantially horizontal axis between a closed position and an open position.

Each of these types of hatches undoubtedly has advantages, in particular an original design and an esthetically attractive maneuvering kinematic for "gull-wing" and "vertical" type hatches, but also disadvantages, in particular in the case of opening a door in a garage or in a parking lot with all hatches that pivot, which disadvantage can be minimal in the case of low vehicles or small hatches but restrict access to the interior of the vehicles.

SUMMARY

An object of the invention is to provide a new type of hatch of a "sliding/hinged door" type that combines simplicity of use and compactness during maneuvering phases, whilst contributing a new esthetic dimension.

To this end, the invention proposes a hatch system for a motor craft, in particular for an automobile vehicle, for example, the hatch being mounted articulated about a substantially horizontal fixed main rotation axis supported by the chassis of the motor craft, and being movable about the main rotation axis manually or automatically between a closed position and an open position by drive means included in this system, which is characterized in that, during a phase of movement of the hatch, the drive means driving rotation of the hatch about the main rotation axis actuate maneuvering means for maneuvering the hatch in rotation in the opposite direction about a secondary rotation axis, these maneuvering means being also included in this system, the combination of these two movements in rotation causing the hatch to move in a substantially vertical plane without causing lateral movement of the hatch during this phase of movement of the hatch.

The means for maneuvering the hatch advantageously comprise an articulated linkage, the geometry of which is deformed during the phase of movement of the hatch in a substantially vertical plane and remains fixed during the rest of the movement of the hatch, preventing rotation of the hatch about the secondary rotation axis.

Generally speaking, the articulated linkage may be constituted of two parts forming between them an angle $\alpha$ that varies during the phase of movement of the hatch in a substantially vertical plane and that is fixed during the rest of the movement of the hatch.

The first part of the articulated linkage may be mounted to rotate about the main rotation axis supported by the chassis of the vehicle and about the secondary rotation axis supported by the hatch, and the rotation drive means that comprise at least one actuator may be mounted articulated about another rotation axis supported by the chassis of the vehicle and about a rotation axis that is supported by the first part of the linkage and that is situated between the main and secondary rotation axes to enable the movement in rotation of the hatch.

In a first embodiment of the invention, the articulated linkage comprises at least one part the length of which varies during the phase of movement of the hatch in a substantially vertical plane, and the two parts of this linkage are then advantageously constituted of two links.

In a first example of this first embodiment, the second part of the articulated linkage is constituted by variable length balancing means mounted articulated between a rotation axis supported by the hatch and said rotation axis supported by the first part of the linkage.

In a second example of this first embodiment, the second part of the articulated linkage is constituted by a slider that is mobile in a groove of the first part of the linkage to vary the length of the slider and thus the position of a rotation axis supported by the hatch, on which axis the slider is mounted articulated.

In a second embodiment of the invention, the first part of the articulated linkage may include an element configured to abut against an angular abutment that is rigidly fastened to the hatch and forms the second part of this linkage, during the rotation of this first part about the secondary rotation axis. This angular (i.e. in rotation) abutment may advantageously be mounted on and fixed relative to the hatch and immediately adjacent the secondary rotation axis.

In this second embodiment, the hatch system may advantageously comprise, in addition to the drive means and the maneuvering means, means for damping the rotation of the first part about the secondary rotation axis, these damping means, such as a hydraulic damper, being mounted on and fixedly fastened to this first part and cooperating with the hatch when it is opened.

Generally speaking, said actuator constituting the drive means for driving rotation of the hatch may advantageously be remote controlled, for example, to drive the rotation of the hatch about the main rotation axis, or else the main rotation axis may be driven in rotation by a drive unit to drive the rotation of the hatch about the main rotation axis and to actuate said actuator associated with the rotation drive means.

The system of the invention may also comprise a locking/unlocking device that is used to disengage the hatch from its bearing points on the bodywork of the vehicle at the beginning of its opening movement (i.e. before it begins its movement in the opening direction), this device comprising for example a retractable roller that cooperates with a substantially vertical ramp forming a fixed guide rail on which it rolls and continues to bear on this ramp during the movement of the hatch in a substantially vertical plane.

Generally speaking, in an automobile vehicle type motor craft equipped with four hinged doors, for example, it is necessary to have an intermediate upright or "B pillar" which notably has the function of supporting part of the opening and closing systems of the four doors. Moreover, these opening and closing systems are concealed by the doors, which requires that the B pillar be set back relative to the general volume of the vehicle.

In the hatch system of the invention, only the bottom part of the B pillar is retained to constitute the guide ramp or rolling ramp for the roller of the locking/unlocking system. This guide ramp or rail may thus advantageously form a B pillar limited to the height of the rail.

The means for driving the hatch may advantageously be situated at the level of the upper frame of the hatch and be shifted (i.e. outset) to the roof of the vehicle, which has the consequence of enabling externalization of the B pillar and thus increasing the interior capacity of the vehicle without modifying its exterior volume (the guide rail thus being externalized relative to the bodywork of the vehicle).

Finally, safety means may also be provided in the hatch system to prevent accidents that could otherwise be suffered by passengers of the vehicle on opening or closing the hatch.

Of course, the invention also concerns a motor craft equipped with at least one hatch that is actuated in the opening or closing direction by a system as defined above.

According to an important advantage of the invention that is common to both embodiments of the invention referred to above, the lateral movement of the hatch produced during opening it is reduced compared to a swinging type hatch pivoting only about a main rotation axis, which is useful notably for saving space when the vehicle is in a parking space, for example. Moreover, this saving in space is retained without necessarily increasing the threshold height of the hatch, i.e. its height above ground.

BRIEF DESCRIPTION OF THE DRAWINGS

Other advantages, features and details of the invention will emerge from the following additional description with reference to the appended drawings, which are provided by way of example only and in which.

DETAILED DESCRIPTION

FIGS. 1 to 4 show the various phases operative during the opening of a "sliding/hinged door" type hatch 1 of the first embodiment of the invention, this hatch 1 being for example a front door of a motor vehicle. The upper frame of the hatch 1 is mounted articulated about a fixed main rotation axis A that is substantially horizontal and supported by the chassis of the vehicle at the level of its roof.

Figure 1:
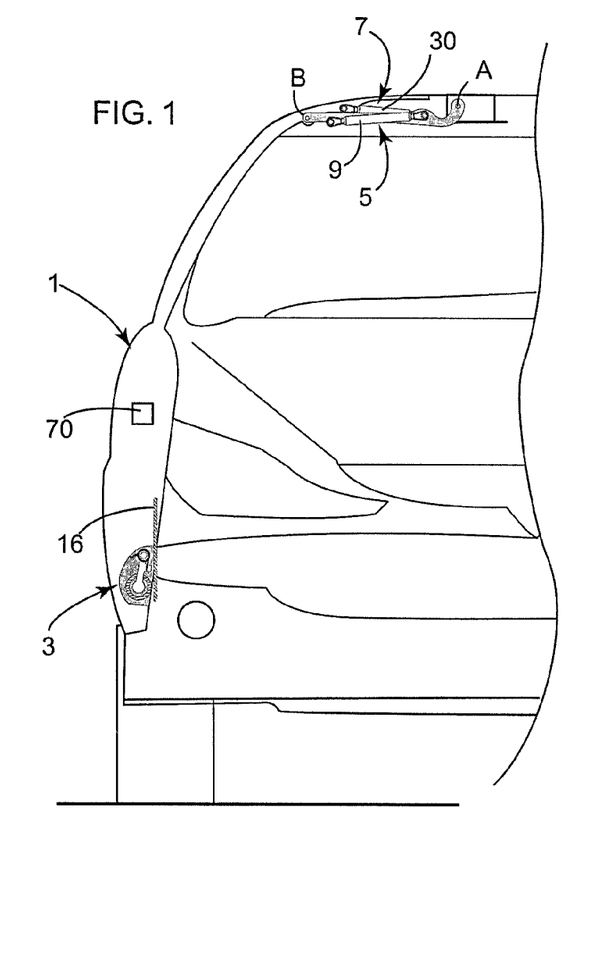
FIGS. 1 to 4 are front views of an automobile vehicle which respectively show the phases of opening a door in the first embodiment of the invention.
Figure 2:
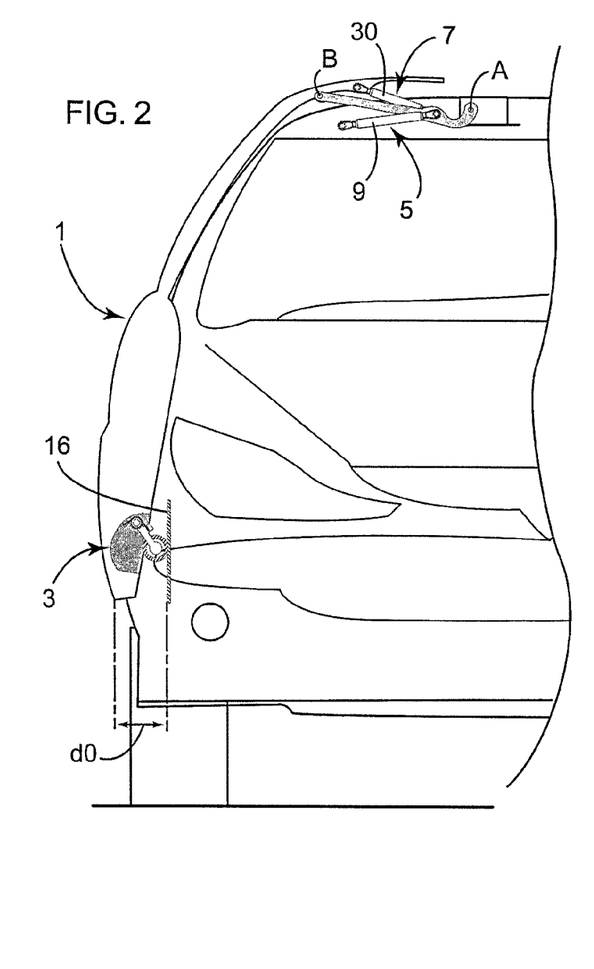
Figure 3:
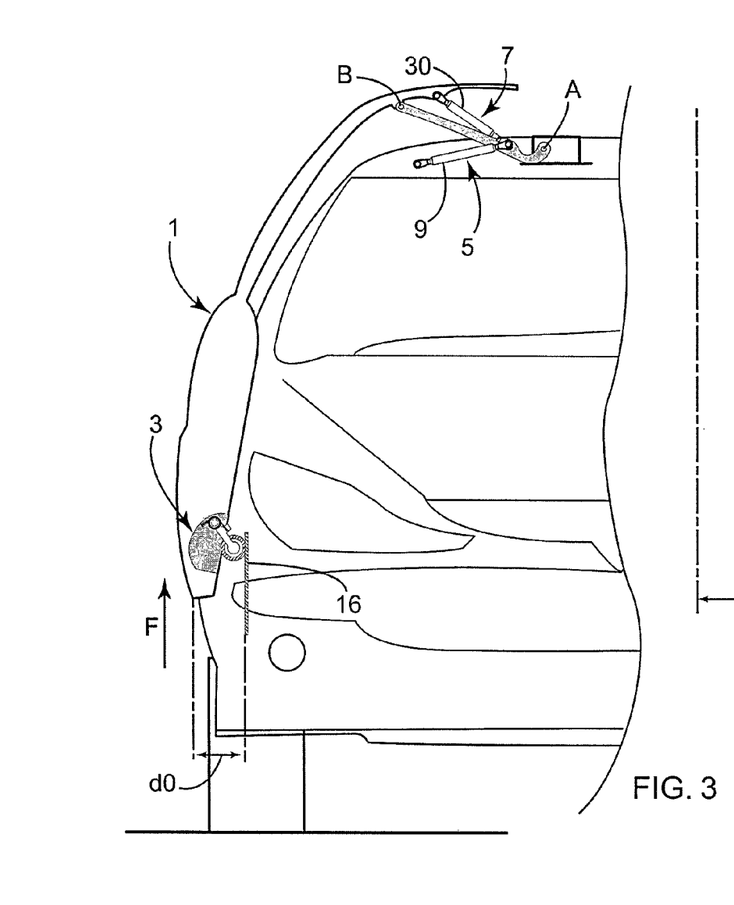
Figure 4:
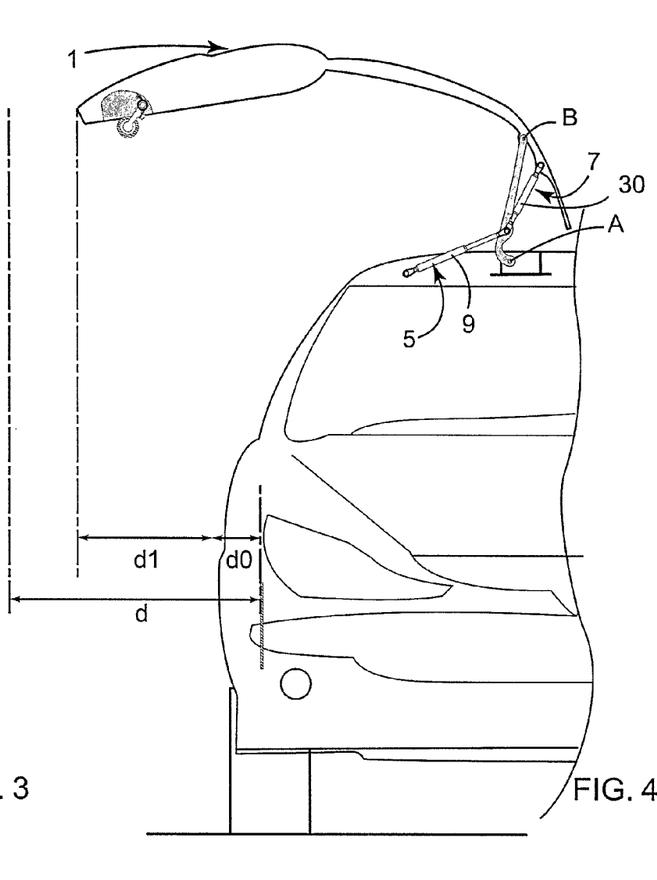

In FIG. 1, the hatch 1 is shown in its closed position. On opening the hatch 1, following mechanical or electrical actuation of a locking/unlocking device 3, which will be described hereinafter, the hatch 1 is disengaged from its bearing points on the bodywork of the vehicle by executing an outward movement in rotation of small amplitude about the main rotation axis A, which is reflected in a small lateral movement over a distance d0, as shown in FIG. 2. Then, as shown in FIG. 3, the hatch 1 effects a movement in translation in the direction of the arrow F in a substantially vertical plane that ideally does not cause any lateral movement, this movement in translation being the combination of a movement in rotation about the main rotation axis A as a result of the action of the drive means 5 and a movement in rotation in the opposite direction about a secondary rotation axis B of maneuvering means 7 driven by the drive means 5 and mounted between the main rotation axis A and the hatch 1. FIG. 3 shows the hatch 1 at the end of its movement in translation, lateral movement of the hatch 1 having been maintained substantially at its value d0. Finally, the hatch 1 effects a movement in rotation about the main rotation axis A without intervention of the maneuvering means 7 following immobilization of the secondary rotation axis B, which is reflected in a lateral movement d1, as shown in FIG. 4, which shows the hatch 1 in its final open position. Of course, these movements of the hatch 1 are in principle effected in the reverse direction in the case of closing it.

Note that the lateral movement of the hatch 1 in its open position is equal to d0+d1, which is less than the movement d that would be produced by movement in rotation alone of the hatch 1 about the main rotation axis A, as may be seen in FIG. 4.

Generally speaking, the various movements of the hatch 1 are obtained by drive means 5 for driving the rotation of the hatch 1 about the main rotation axis A, which means may for example be constituted by at least one actuator 9 the mounting of which will be explained in the description of the maneuvering means 7.

The various movements referred to above of the hatch 1 in the case of opening it will be explained in detail next.

Figure 5:
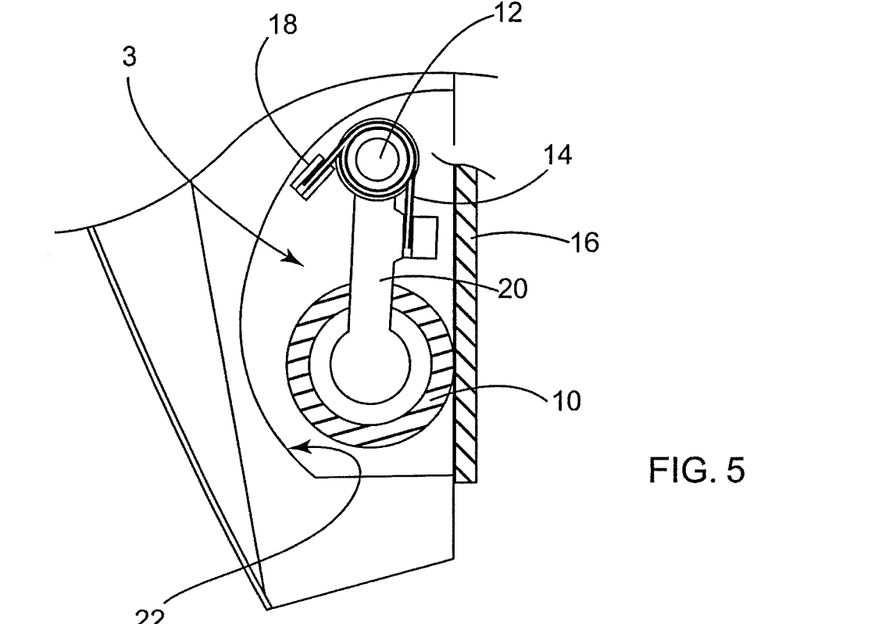
FIGS. 5 and 6 show the two positions of a device for locking/unlocking this hatch to cause it to move from the FIG. 1 position to the FIG. 2 position.
Figure 6:
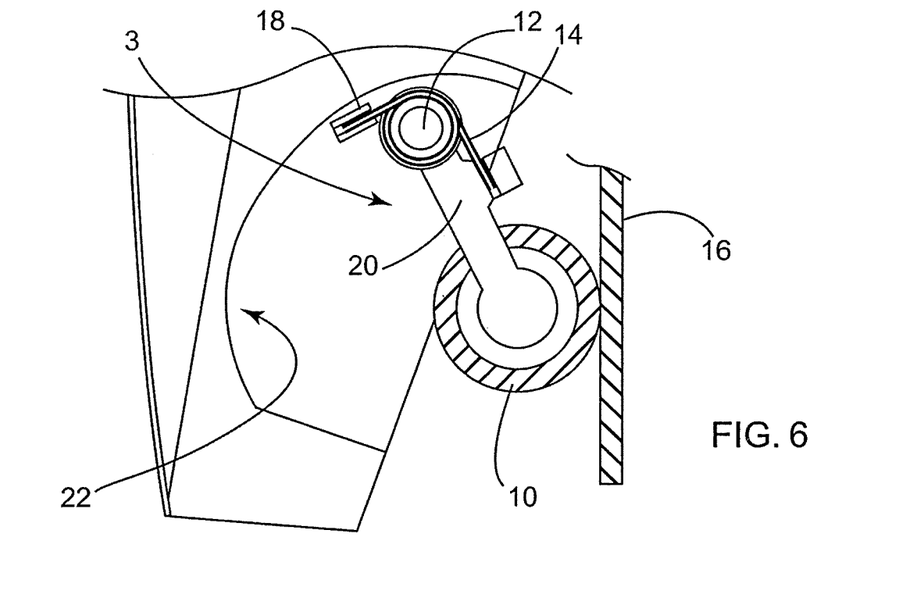

FIGS. 5 and 6 show one embodiment of the locking/unlocking device 3 that is actuated at the beginning of the phase of opening the hatch 1. The device 3 comprises notably a retractable roller 10 mounted to pivot about a rotation axis 12 that is parallel to the main rotation axis A of the hatch 1. The retractable roller 10 is spring-loaded by a torsion spring 14, for example, to take up either a rest or retracted position (FIG. 5) or an active position (FIG. 6) causing disengagement of the hatch 1 following a movement in rotation of small amplitude of the hatch 1 about the main rotation axis A. The retractable roller 10 is mounted in the bottom part of the hatch 1 and cooperates with a substantially vertical fixed guide ramp 16 rigidly fastened to the chassis of the vehicle. The torsion spring 14 executes at least one turn about the rotation axis 12 of the roller 10, for example. One end of the torsion spring 14 is anchored at a fixed point 18 of the hatch 1 and its other end is anchored to a support arm 20 of the roller 10. In its retracted position (FIG. 5) the roller 10 takes up a position in a housing 22 of the hatch 1, the torsion spring 14 being in the armed position, and is situated toward the bottom end of the guide ramp 16. When the locking/unlocking device 3 is actuated, the torsion spring 14 is released, which causes movement in rotation of small amplitude of the hatch 1 about its main rotation axis A, while the roller 10 is moved a short distance on the ramp 16 whilst remaining in contact with it.

To go from the position shown in FIG. 2 to the position shown in FIG. 3, the aforementioned drive means 5 of the hatch 1 actuate the maneuvering means 7 referred to above that are constituted by a deformable linkage 30 that enables the hatch 1 to pivot in the opposite direction about the secondary rotation axis B referred to above whilst pivoting about the main rotation axis A. The combination of these two movements in rotation drives the movement of the hatch 1 in a substantially vertical plane in the manner of a sliding door.

Figure 7:
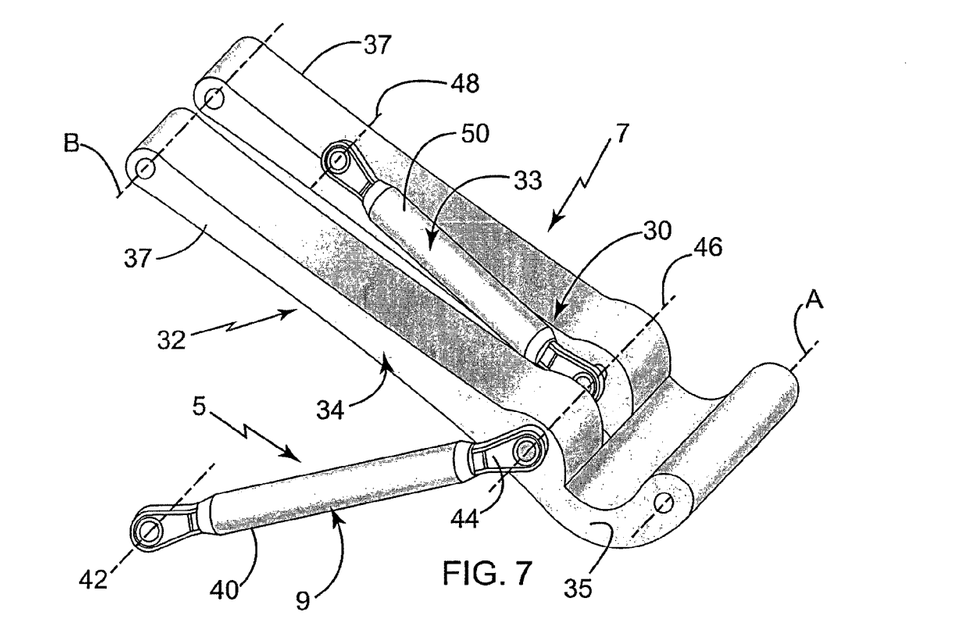
FIGS. 7 to 10 show means for maneuvering this hatch in a first example of the first embodiment.
Figure 8:
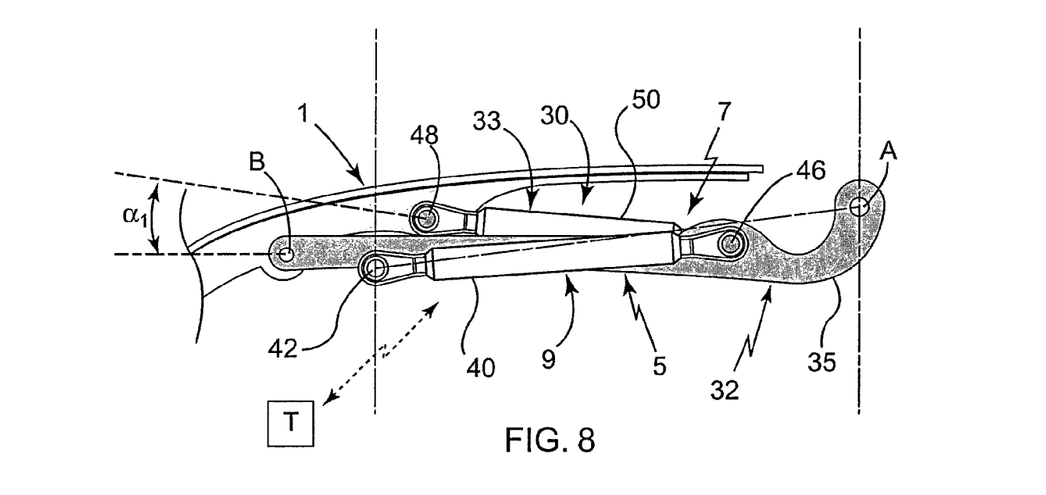

In a first example of the first embodiment shown in FIGS. 7 to 10, the deformable linkage 30 comprises two parts 32 and 33. Referring to FIG. 7, the first part 32 is constituted by a connecting bar 34, which may be U-shaped with a heel 35 and two lateral branches 37. This connecting bar 34 is mounted so that its heel 35 pivots about the main rotation axis A supported by the chassis of the vehicle, while the ends of its two branches 37 pivot about the secondary rotation axis B supported by the hatch 1. The cylinder 40 of the actuator 9 of the drive means 5 is mounted articulated about a rotation axis 42 supported by the chassis of the vehicle, and its rod 44 is mounted articulated about a rotation axis 46 that passes through the two lateral branches 37 of the connecting bar 34 in the vicinity of the heel 35, or vice-versa. It is important to note that the four rotation axes A, B, 42 and 46 are parallel to each other, and that the rotation axis 46 of the actuator 9 of the drive means 5 is situated between the main rotation axis A and the secondary rotation axis B. In this way, actuation of the actuator 9 may drive rotation of the hatch 1 about the main rotation axis A. The second part 33 is constituted by so-called balancing means 50, which is a telescopic element with limited travel, such as an actuator or a gas strut, for example. One end of the balancing means 50 is mounted articulated to rotate about the rotation axis 46 common to the connecting bar 34 and the drive actuator 9 and its other end is mounted on the hatch 1 and articulated about a rotation axis 48.

The linkage 30 is constituted of the two parts 32 and 33 which form between them an angle α. To be more precise, when the hatch 1 is in the position shown in FIG. 2, which is also the position shown in FIG. 8, the angle α formed by the two parts 32 and 33 has a minimum value $α_1$, of the order of a few degrees, i.e. the two parts 32 and 33 are almost parallel to each other. When the hatch 1 goes to the position shown in FIG. 3, which is also the position shown in FIG. 9, it pivots about the main rotation axis A, but also about the secondary rotation axis B as a result of the lengthening of the balancing means 50, which is reflected in the angle α between the two parts 32 and 33 opening out to a maximum value $α_2$.

In other words, the angular movement of the hatch 1 caused by its rotation about the main rotation axis A is compensated by a movement of the hatch 1 in the opposite direction under its own weight about the secondary rotation axis B as a result of the lengthening of the balancing element 50, so that the hatch 1 may be moved in translation in a substantially vertical plane.

Figures 9, 10:
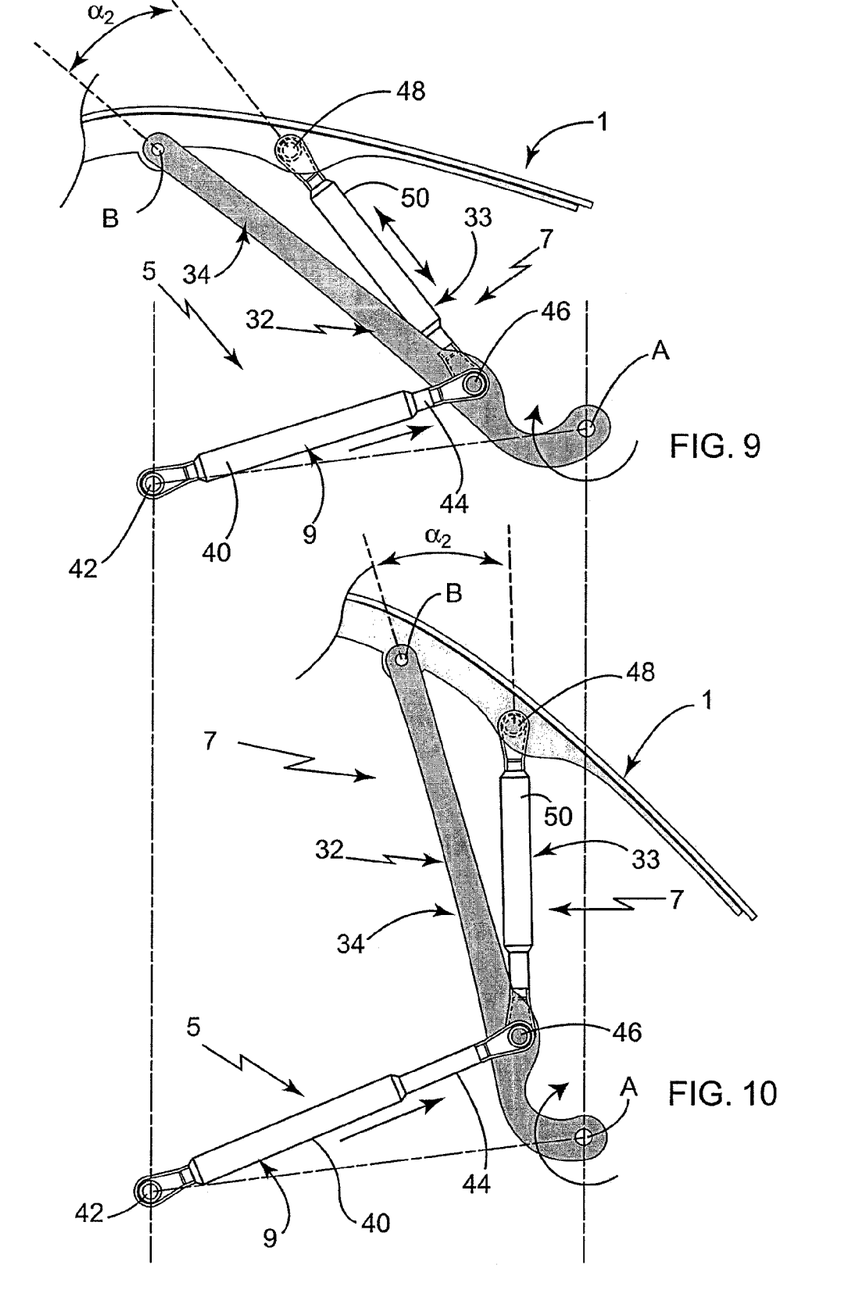

Once the hatch 1 has completed its movement in a substantially vertical plane (FIG. 3), the balancing element 50 has reached a fixed length, the effect of which is to block rotation of the hatch about the secondary axis B, the angle α has reached its maximum value and the linkage 30 is in a locked or non-deformable state. The end of the movement of the hatch between the positions shown in FIGS. 3 and 4 is effected simply by driving the actuator 9 of the drive means 5, which is reflected in a movement in rotation about the main rotation axis A that generates the movement d1 of the hatch 1. FIG. 10 represents the same position as FIG. 4 with the hatch 1 completely open. Of course, the movements of the hatch 1 that have just been described for opening the hatch 1 are carried out in reverse order when the hatch 1 is lowered toward its closed position. The actuator 9 may be controlled by a remote controller T shown diagrammatically in FIG. 8, for example.

Figure 11:
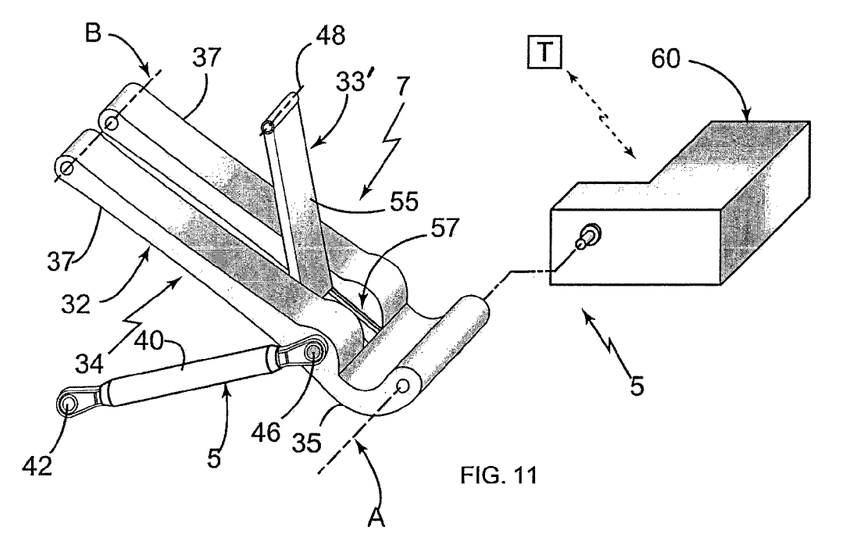
FIG. 11 shows means for maneuvering the hatch in a second example of the first embodiment.

In a second example of the maneuvering means 7 of the hatch 1 of the first embodiment, the second part 33' formed by the balancing means 50 may be replaced by a slider 55 the length of which may be varied by causing it to move in a groove 57 provided for example between the two lateral branches 37 of the part 32 of the linkage 30, as shown in FIG. 11.

Figure 13:
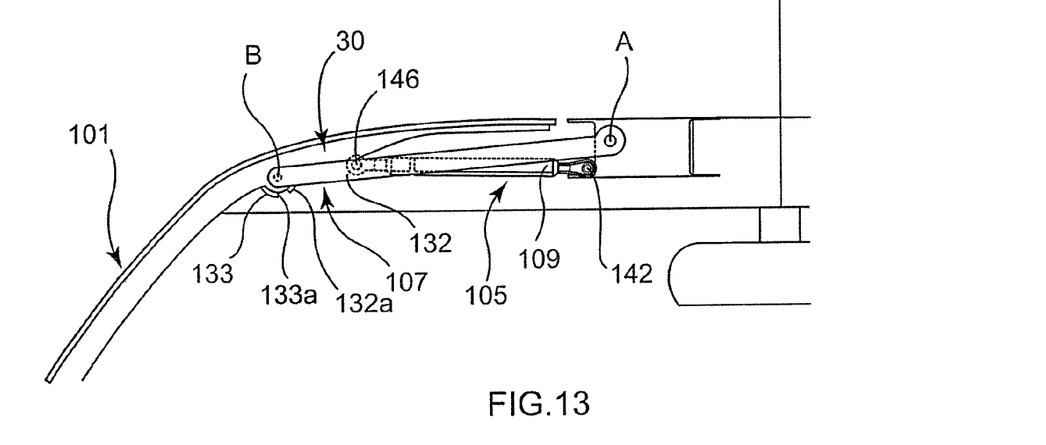
FIGS. 13 and 14 are two diagrammatic partial side views showing a door type hatch system of the second embodiment of the invention, respectively in a closed position and in a partially open position of the hatch.
Figure 14:
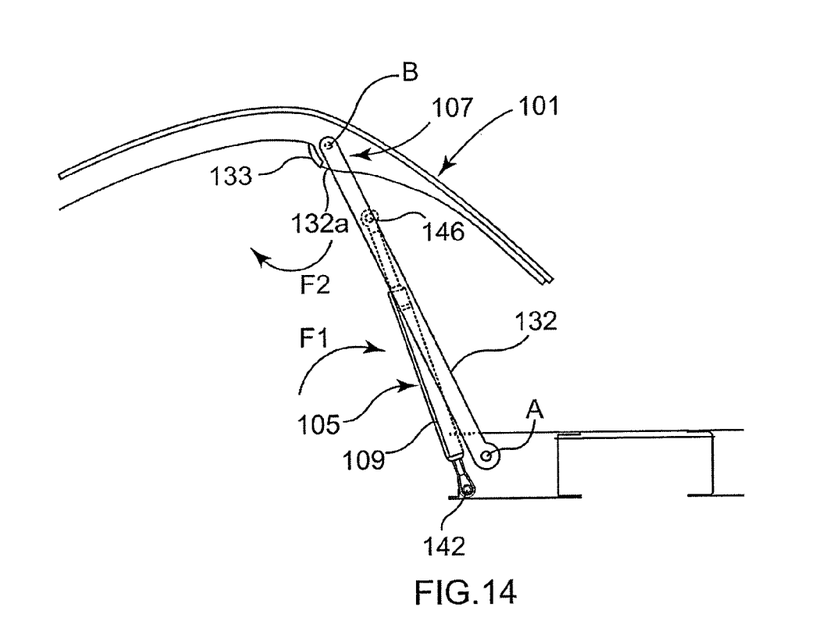
Figure 15:
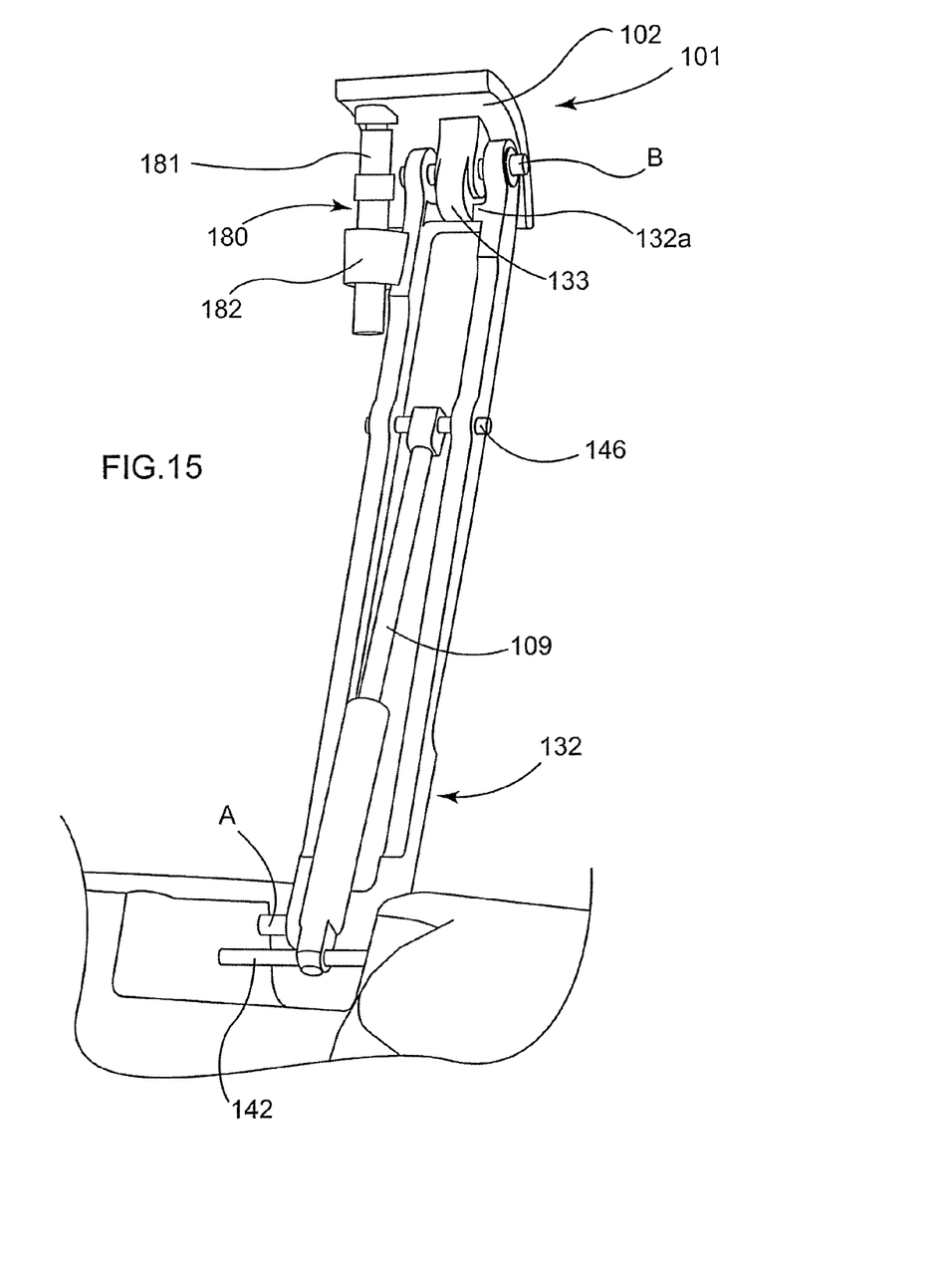
FIG. 15 is a detail view in perspective showing the structure of the hatch drive and maneuvering means of this second embodiment in a completely open position thereof, and return means for damping the pivoting of this hatch.

FIGS. 13 to 18 show an opening system of a second embodiment of the invention, FIG. 15 notably showing:

means 105 for driving rotation of the hatch 101 about the main rotation axis A (in the direction of the arrow F1, see FIGS. 14 and 17) that are constituted of an actuator, for example a gas cylinder 109, articulated at its laterally internal end to a rotation axis 142 supported by the chassis of the vehicle (in contrast to the axis 42 of the aforementioned first embodiment, this fixed axis 142 is adjacent the axis A, in this example situated just below the axis A and outwardly thereof in the lateral direction of the vehicle), and means 107 for maneuvering the hatch 101 in rotation in the opposite direction about the secondary rotation axis B supported by the hatch 101 (see arrow F2 in FIGS. 14 and 17), which means 107 are actuated by the movement of the actuator 109 via the articulation of the other end thereof to a rotation axis 146 supported by these maneuvering means 107 and which means are constituted by a linkage 30 formed of:

a first part 132 or connecting bar that is in the form of a link articulated at its ends to the axes A and B and that carries the axis 146 of the actuator 109 nearer the axis B than the axis A, and a second part 133 forming an angular abutment that is mounted on and fixed to the frame 102 of the hatch 101 and against which is designed to abut a transverse element 132*a* of the first part 132 on rotation of the latter, with the result that the combination of these two rotation movements about the axes A and B drives the movement of the hatch 101 in a substantially vertical plane.

To be more precise, it is seen in FIG. 15 that the angular abutment 133 is mounted about the axis B, defining a pivoting abutment surface 133*a* with the link 132 that is situated immediately below this axis B (see FIGS. 13 and 14 in particular for this relative positioning of the abutment surface 133*a*).

Furthermore, and as may be seen in FIGS. 15 to 18, the hatch system of this second embodiment of the invention may advantageously comprise return or damping means 180 constituted for example of a hydraulic damper rigidly fastened to the link 132 and cooperating with the frame 102 of the hatch 101 to damp the pivoting of that link 132 against the abutment 133. In this embodiment this damper 180 includes a rod 181 that is mounted to be mobile in translation inside a threaded support 182 rigidly fastened to the link 132 in the vicinity of the axis B and the free end of which comes into contact with the frame 102 of the hatch 101 when the latter is not occupying the FIG. 16 closed position (i.e. when in the partly or fully open position, see FIGS. 17 and 18).

Figure 16:
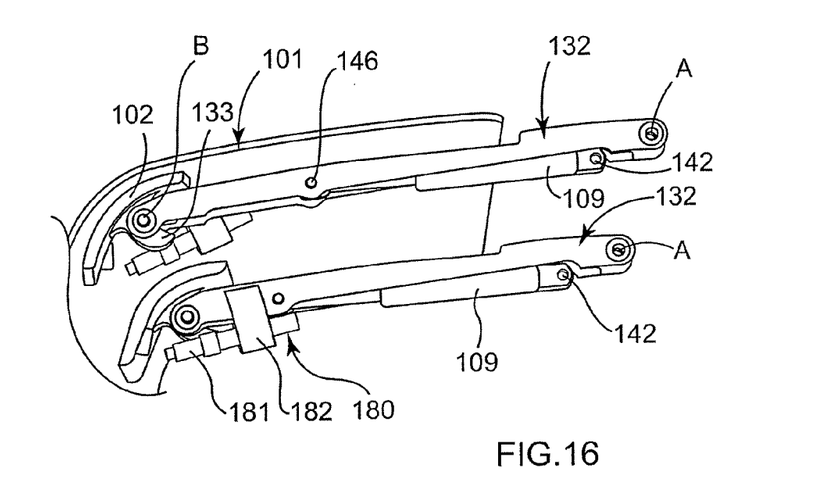
FIGS. 16 and 17 are two perspective views showing the details of the structure with two identical twinned linkages of the hatch system from FIG. 15, respectively in a closed position and in an intermediate opening position.

The operation of this hatch system when it opens will be described next, starting from the closed position of FIG. 16 in which the gas cylinder 109 is compressed, which does not generate any rotation of the link 132 about the axes A and B. It is seen in this FIG. 16 that the damper 180 is not in contact with the hatch 101 and is thus inactive.

Figure 17:
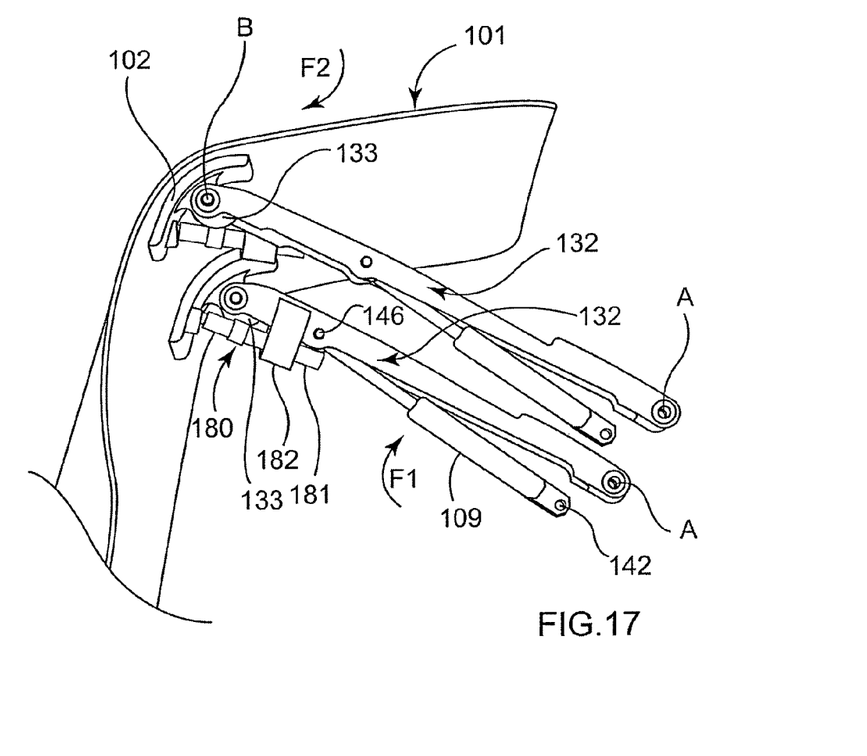

To obtain the intermediate open position of FIG. 17, it is seen that the link 132 has pivoted about the main axis A as a result of the effect of the expansion of the gas cylinder 109 generating an increase in its travel, with rotation in the reverse direction of its end adjacent the secondary axis B which comes to abut against the angular stop 133 of the hatch 101. Moreover, this pivoting of the hatch 101 at the level of the axis B at the corresponding end of the link 132 is damped by the damper 180 until the transverse element 132a of this link 132 reaches the surface 133a of the abutment 133.

As in the first embodiment described above, it is this combination of two rotations in the opposite directions F1 and F2 that enables generation, in an initial step of opening the hatch 101, of the movement of the latter in a virtually vertical plane, i.e. without causing lateral movement of the hatch 101 during this initial opening.

Figure 18:
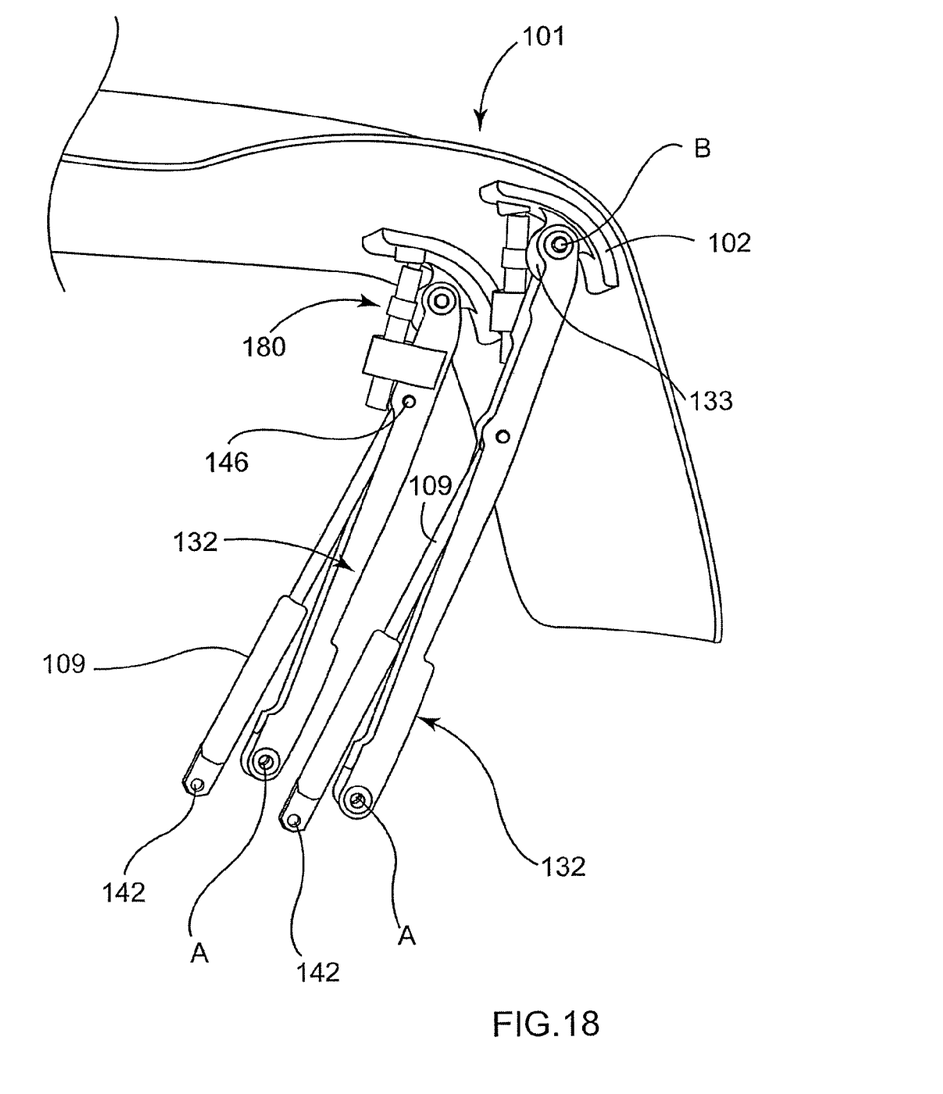
FIG. 18 is a perspective view of the hatch system from FIGS. 16 and 17 in a final completely open position of the hatch.

Once the angular abutment 133 is reached, the combination of the link 132 and the hatch 101 pivots about the main axis A with the axis B immobilized against this abutment 133 during the remainder of the opening of the hatch 101 with, in the FIG. 18 completely open position, a maximum travel of the gas cylinder 109.

In the embodiments that have just been described the drive means 5 for opening and closing the hatch 1 are actuated by the actuator 9 or any other analogous drive means the length of which varies, but the actuator 9 may also be actuated manually by operating a handle on the outside of the hatch 1. Alternatively, drive means 5 may equally be provided that drive rotation of the main drive axis A. To this end, as symbolically represented in FIG. 11, a drive unit 60 may be used to drive the rotation of the main rotation axis A which is then rigidly fastened to the part 32 of the linkage to drive it in rotation. In this case, the actuator 9 of the drive means is driven by the rotation of the part 32 of the linkage 30. The drive unit 60 may be controlled by a remote controller T, for example.

Generally speaking, in an automobile vehicle that is equipped with four hinged doors, for example, it is necessary to have an intermediate upright or "B pillar" that notably has the function of supporting part of the opening and closing systems of the doors. Moreover, this B pillar is set back relative to the general volume of the vehicle.

Figure 12:
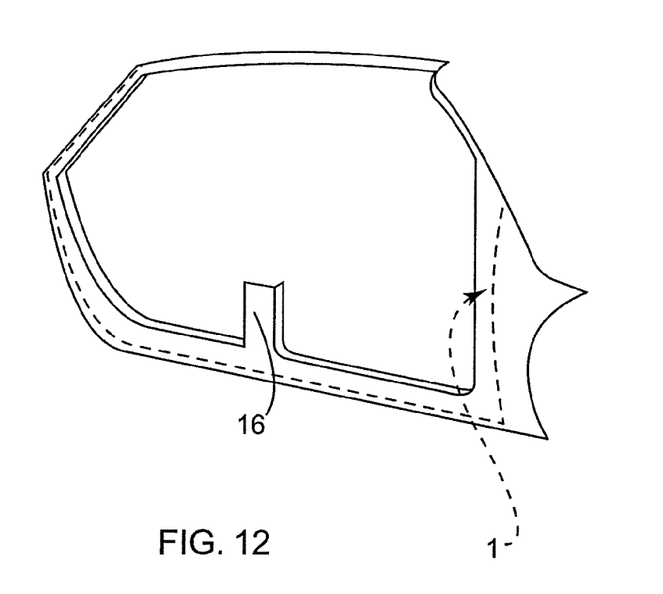
FIG. 12 is a diagram showing a detail of a hatch system of the invention that may be used in the first and second embodiments of the invention.

According to the invention, as is shown diagrammatically in FIG. 12, the guide ramp 16 that serves as a rolling track for the retractable roller 10 when the hatch 1 moves in a substantially vertical plane at the beginning of its opening movement also forms a B pillar that does not extend the whole of the height of the door frame.

Moreover, the hatch drive system 5 is situated at the level of the upper frame of the hatch 1 and its articulation about the main rotation axis A encroaches on the roof, so that it is possible to externalize the guide ramp 16, which no longer penetrates into the interior volume of the passenger compartment of the vehicle.

For example, the hatch 1 may be equipped with proximity sensors 70 (FIG. 1) of the ultrasound type that may prevent opening or closing of the hatch in the presence of a person situated in the vicinity of the hatch 1. The hatch 1 may equally be equipped with a sound system that warns of opening or closing of the hatch. Finally, the hatch 1 may be equipped with anti-pinching sensors that stop the opening or closing process in the presence of a foreign body, for example a hand, that could become stuck on closing the hatch 1, for example.

The invention claimed is:

1. Hatch system for a motor craft having a body, in particular for an automobile vehicle, said hatch system comprising:
a hatch articulated to be movable about a substantially horizontal fixed main rotation axis supported by said body, between a closed position and an open position by drive means included in said hatch system,
wherein during a phase of movement of said hatch, the drive means which drive the hatch in rotation in a first direction about the main rotation axis actuate maneuvering means for maneuvering said hatch in rotation in a second direction opposite said first direction about a secondary rotation axis, said maneuvering means being also included in said hatch system,
the combination of rotation movements respectively in said first direction and in said second direction causing said hatch to move in a substantially vertical plane without causing lateral movement of said hatch during said phase of movement of said hatch.

2. Hatch system according to claim 1, wherein the maneuvering means for maneuvering said hatch comprise an articulated linkage, the geometry of which varies during a phase of movement of said hatch in said substantially vertical plane and remains fixed during a remaining phase of movement of said hatch, the fixed geometry preventing rotation of said hatch about the secondary rotation axis.

3. Hatch system according to claim 2, wherein the articulated linkage comprises at least one part the having a length which varies during said phase of movement of said hatch in said substantially vertical plane.

4. Hatch system according to claim 2, wherein the articulated linkage is constituted of two elongated parts comprising a first part and a second part forming between them an angle α that varies during the phase of movement of said hatch in said substantially vertical plane and that is fixed during said remaining phase of movement of said hatch.

5. Hatch system according to claim 4, wherein said first part of the articulated linkage is mounted to rotate about the main rotation axis supported by said body and about the secondary rotation axis supported by said hatch, and wherein said drive means that comprise at least one actuator are articulated about another rotation axis supported by said body and about a rotation axis that is supported by said first part of said articulated linkage, said rotation axis being situated between the main rotation axis and the secondary rotation axis.

6. Hatch system according to claim 5, wherein said second part of the articulated linkage is constituted by variable length balancing means articulated between a rotation axis supported by said hatch and said rotation axis supported by said first part of said articulated linkage.

7. Hatch system according to claim 5, wherein said second part of the articulated linkage is constituted by an elongated slider that is mobile in a groove of said first part of the linkage and that varies the length of this slider and thus a position of a rotation axis supported by said hatch, on which rotation axis the slider is articulated.

8. Hatch system according to claim 5, wherein said first part of the articulated linkage includes an element configured to abut against an angular abutment that is rigidly fastened to said hatch and forms said second part of the articulated linkage, during the rotation of said first part about the secondary rotation axis.

9. Hatch system according to claim 8, wherein the angular abutment is mounted on and fixed relative to said hatch and immediately adjacent the secondary rotation axis.

10. Hatch system according to claim 8, wherein said hatch system comprises, in addition to the drive means and the maneuvering means, damping means for damping a rotation of said first part about the secondary rotation axis, the damping means being mounted on and fixedly fastened to said first part and cooperating with said hatch when it is opened.

11. Hatch system according to claim 5, wherein said at least one actuator constituting the drive means for driving rotation of said hatch is driven automatically by a remote controller which is included in said hatch system and remotely connected to said at least one actuator to drive the rotation of the hatch about the main rotation axis, or else wherein the main rotation axis (A) is driven in rotation by a drive unit to drive the rotation of said hatch about the main rotation axis and to actuate said at least one actuator associated with said drive means.

12. Hatch system according to claim 1, wherein a locking/unlocking device disengages said hatch from its bearing points on said body of the vehicle at a beginning of an opening movement of said hatch.

13. Hatch system according to claim 12, wherein the locking/unlocking device comprises a retractable roller that rolls on a guide rail during the movement of said hatch in said substantially vertical plane.

14. Hatch system according to claim 13, wherein the guide rail exhibits a height and forms a B pillar limited to said height.

15. Hatch system according to claim 1, wherein the drive means of said hatch are mounted at the level of an upper frame of said hatch and are outset on a roof of the vehicle.

16. Hatch system according to claim 13, wherein the guide rail is externalized relative to said body of the vehicle.

17. Motor craft comprising at least one hatch, wherein said motor craft comprises a hatch system for opening or closing said at least one hatch, said hatch system being as defined by claim 1.

* * * * *